UNITED STATES PATENT OFFICE.

DAVID K. TUTTLE, OF PHILADELPHIA, PENNSYLVANIA, AND CABELL WHITEHEAD, OF WASHINGTON, DISTRICT OF COLUMBIA.

PROCESS OF REFINING SLIMES FROM THE ELECTROLYTIC REFINING OF COPPER.

SPECIFICATION forming part of Letters Patent No. 509,634, dated November 28, 1893.

Original application filed February 20, 1892, Serial No. 422,206. Divided and this application filed September 19, 1893. Serial No. 485,894. (No specimens.)

*To all whom it may concern:*

Be it known that we, DAVID K. TUTTLE, residing at Philadelphia, in the county of Philadelphia, State of Pennsylvania, and CABELL WHITEHEAD, residing at Washington, in the District of Columbia, citizens of the United States, have invented certain new and useful Improvements in Processes of Refining Slimes from the Electrolytic Refining of Copper; and we do hereby declare the following to be a full, clear, and exact description of the invention, such as will enable others skilled in the art to which it appertains to make and use the same.

In the electrolytic refining of crude copper containing precious metals, plates of the crude copper are immersed in a suitable liquid, and subjected to the action of the electric current. By this process copper is dissolved at the anode, and deposited upon the cathode in a pure condition, while the precious metals remain unacted upon. This forms an excellent process for the preparation of pure copper, but the precious metals are left in a very undesirable condition.

The residues obtained from the electrolytic copper process consist of a mixture of very fine particles, constituting the more valuable part, or the slimes proper, and of pieces of copper of considerable size. These latter are of two kinds: first, bits of the original crude copper that have become detached and fallen off from the anodes, and noses of copper that have formed on the cathode, and have afterward been broken off. The residues are therefore passed over a suitable screen to remove the coarse pieces of copper, which are sent to the smelting furnace, or otherwise disposed of, leaving the fine material as slimes. These final residues or slimes, which it is the object of our process to treat, contain the precious metals, and nearly all of the impurity of the crude copper, largely in the metallic state, but some in a more or less oxidized condition. Besides their proper metallic constituents, the slimes contain extraneous matter, or dirt, frequently organic matters, derived from the lining material of the electrolyzing tanks. The average composition of these slimes may be taken as about fifty per cent. precious metals and fifty per cent. impurities. Of the latter fifteen to thirty per cent. will be metallic copper, and twenty to thirty-five per cent. will consist of a number of elements such as arsenic, antimony, tellurium, selenium, bismuth, lead, iron, &c., some of which may be present in the metallic state, but for the most part are in a more or less oxidized condition, and some copper in an oxidized state.

Four principal methods have been proposed and used for the treatment of these slimes, but they are all incomplete and expensive. By one method the slimes are mixed with charcoal and melted. The resulting bars are then parted by the sulphuric acid process. The great objection to this process is that the impurities are not removed, and the resulting bullion has to undergo an expensive refining operation to secure fine metal. In the second process the slimes are cupelled with lead. This is an expensive operation, entailing the loss of the copper, and considerable loss of silver in the operation. The third process is to treat the slimes with hydric nitrate. This is an exceedingly expensive operation, and does not yield a fine bullion. The fourth process is to treat with strong hydric sulphate. This also yields a very impure bullion.

By our invention we secure the removal of the injurious impurities from the slimes, as a preliminary step, so that the precious metals can be obtained in a condition of great purity and the copper recovered in a useful form. These results are also secured at a much less expense than by any other known process. By injurious impurities are meant those impurities such as arsenic, antimony, tellurium, selenium, bismuth, iron, &c., which injure the qualities of gold and silver so as to prevent the application of the precious metals to their common uses and must therefore be removed, when found in gold and silver, before the precious metals can be utilized.

By our process we remove the oxides, salts, and subsalts of various metals present as well as certain metals that are directly soluble in dilute acid, and then treat the purified slimes with strong and hot sulphuric acid, after which the sulphates of silver and copper are separated from the insoluble residue, and this residue is melted with suitable fluxes to produce fine gold.

To more fully explain the action of our process we will describe it as it is actually carried out in connection with an electrolytic copper refinery, without, however, limiting ourselves to the exact mode of procedure laid down.

The first operation can be carried out in any suitable tank provided with means for heating. A proper amount of dilute, say ten to twenty per cent., acid, either sulphuric or hydrochloric, is run into the tank, the slimes added, and heat applied. After from ten to thirty minutes' boiling it will be found that the oxides, salts and subsalts, together with some of the metals, have gone into solution, leaving, however, the gold and silver behind. When this has been effected the acid solution is separated from the purified residues by any suitable means. By this operation the injurious impurities consisting of arsenic, antimony, tellurium, selenium, bismuth, iron, &c., are dissolved and removed. The copper that is present in the oxidized condition is also dissolved and removed. Should, by any chance, silver go into solution it would be at once returned to the metallic state and precipitated by contact with the large excess of metallic copper present in the residue. As this process will be generally carried on in connection with the electrolytic copper refining the slimes may be run directly into the dissolving tanks without any intermediate drying. If the solution from this first treatment contains a sufficient amount of copper to make it pay, that metal may be readily recovered as cement copper by passing the solution over metallic iron. The purified residues now consist of metallic silver, gold and copper, and sulphate of lead, and are ready for the second step of the process. The residue is subjected to the action of hot hydric sulphate in the form of oil of vitriol, either with or without previous melting. By this treatment the silver is dissolved as sulphate while the copper is converted into an anhydrous and practically insoluble sulphate. As soon as this treatment is completed the contents of the kettle are allowed to stand at a gentle heat, when the gold together with the sulphates of copper and lead settle to the bottom leaving a clear solution of sulphate of silver which is separated by the usual means, and the silver recovered, preferably by precipitation by metallic copper. The residue is then removed from the kettle and the sulphate of copper is dissolved out in water. The solution of sulphate of copper is separated from the residue and the final residue is melted with suitable fluxes to fine gold.

The solution of sulphate of copper will frequently contain a little silver, and this is recovered by means of metallic copper in the usual way, after which the sulphate of copper may be recovered by crystallization, or the copper may be precipitated by iron, or the solution otherwise utilized.

In some cases it may be preferable to wash the residue in the dissolving kettle with strong hydric sulphate until free from silver before bringing the sulphate of copper into solution in water.

In this application we have not claimed the preliminary treatment of the slimes with dilute acid broadly as that is claimed in a pending application, Serial No. 422,206, filed February 20, 1892, of which this is a divisional application.

What we claim as new and valuable is—

1. The process of treating slimes from the electrolytic process of refining copper, which consists in removing arsenic, antimony, tellurium, bismuth and other impurities present as oxides by treating the slimes with dilute acid, and heating the purified slimes with strong hydric sulphate, substantially as described.

2. The process of treating slimes from the electrolytic process of refining copper, which consists in removing arsenic, antimony, tellurium, bismuth and other impurities present as oxides by treating the slimes with dilute acid, heating the purified slimes with strong hydric sulphate, and separating the solution of sulphate of silver from the residue, substantially as described.

3. The process of treating slimes from the electrolytic process of refining copper, which consists in treating the slimes with dilute acid to remove arsenic, antimony, tellurium, bismuth, and other impurities present as oxides, heating the purified slimes with strong hydric sulphate, separating the solution of sulphate of silver from the residue, and treating this residue with water to remove sulphate of copper, substantially as described.

4. The process of treating slimes from the electrolytic process of refining copper, which consists in treating the slimes with dilute acid to remove arsenic, antimony, tellurium, bismuth, and other impurities present as oxides, heating the purified slimes with strong hydric sulphate, separating the solution of sulphate of silver from the residue, treating this residue with water to remove sulphate of copper, and melting the final residue with a suitable flux, substantially as described.

In testimony whereof we affix our signatures in presence of two witnesses.

DAVID K. TUTTLE.
    CABELL WHITEHEAD.

Witnesses as to David K. Tuttle:
 JAS. J. CULLEN,
 HUGH I. CARROLL.
Witnesses as to Cabell Whitehead:
 FREDERIC P. DEWEY,
 CHARLES EARL.